United States Patent [19]

Beerbower et al.

[11] 3,998,772

[45] Dec. 21, 1976

[54] NOVEL RUBBER LATICES AND METHOD OF PRODUCING SAME

[76] Inventors: Alan Beerbower, 1400 Lamberts Mill Road, Westfield, N.J. 07090; Gilbert W. Burton, 1179 Puddingstone Road, Mountainside, N.J. 07092; Paul L. Malloy, 408 Grove St., Westfield, N.J. 07090

[22] Filed: July 25, 1975

[21] Appl. No.: 599,065

Related U.S. Application Data

[63] Continuation-in-part of Ser. No. 509,860, Sept. 27, 1974, abandoned.

[52] U.S. Cl. .................. 260/23.7 A; 252/DIG. 2; 252/351; 252/356; 252/357; 260/23.7 B; 260/29.7 B; 260/29.7 W; 260/29.7 T; 260/888
[51] Int. Cl.² .............. B01F 17/00; C08L 91/00; C11D 9/04
[58] Field of Search .............. 260/23.7 B, 29.7 B, 260/29.7 W, 888, 29.7 T, 23.7 A; 252/DIG. 2, 351, 356, 357

[56] References Cited

UNITED STATES PATENTS

| | | | |
|---|---|---|---|
| 3,062,767 | 11/1962 | Hunter et al. | 260/29.7 R |
| 3,379,666 | 4/1968 | Becker | 260/29.7 T |
| 3,725,286 | 4/1973 | Pettigrew | 252/89 |

*Primary Examiner*—Eugene C. Rzucidlo
*Assistant Examiner*—H. H. Fletcher
*Attorney, Agent, or Firm*—J. J. Mahon

[57] ABSTRACT

Butyl rubber or EPDM elastomer latices having excellent mechanical stability are prepared by emulsifying the elastomer cement (hydrocarbon solution) with water, a water-soluble soap of a fatty acid containing 12 to 24 carbon atoms using an alkali metal or ammonium radical to form the soap and a second stabilizer additive which is an alkali metal, ammonium or amine salt of a long chain alpha olefin polymeric or copolymeric substituted organic aliphatic mono or dicarboxylic acid or anhydride thereof of a number average molecular weight between about 500 and about 3500 and thereafter removing the hydrocarbon solvent therefrom by flashing the same off by steam or vacuum distillation or other suitable solvent separation method.

18 Claims, No Drawings

NOVEL RUBBER LATICES AND METHOD OF PRODUCING SAME

CROSS-REFERENCE TO RELATED APPLICATIONS

This application is a continuation-in-part of U.S. application Ser. No. 509,860, filed Sept. 27, 1974, now abandoned.

BACKGROUND OF THE INVENTION

1. Field of the Invention

The present invention relates to the manufacture of chemically sensitive, mechanically stable low unsaturation elastomer, such as butyl rubber or EPDM latices which are easily manufactured to give commercial products of roughly 50–68% solids content and having a desirable low viscosity. These are generally prepared by emulsifying butyl rubber or EPDM in the form of hydrocarbon solutions using water and a surfactant. Butyl rubber latices constitute the preferred embodiment of the present invention.

2. Description of the Prior Art

Butyl rubber is, of course, a conventional widely used article of commerce today. Briefly, it is the copolymer of isobutylene or another isoolefin of closely related molecular weight with a diolefin, usually isoprene or butadiene, in which the major component is isobutylene and the minor component is the isoprene or butadiene. It is prepared by a copolymerization at low temperatures, i.e., of the order of −40° to −164° C. in the presence of a Friedel-Crafts type catalyst using, for example, 1 to 10 parts by weight of isoprene and 99 to 90 parts by weight of isobutylene. The polymerization may be stopped after the desired degree of polymerization has occurred through the introduction of an inactivator such as methyl alcohol, water, an amine, or isopropyl alcohol, after which the mixture is treated to recover the polymer from a water suspension by any convenient manner such as straining or filtering or otherwise as may be convenient. The polymer is then dried either as a blanket passing through a tunnel drier or on a mill. In connection with the present invention, the butyl rubbers employed in making up the latices generally have number average molecular weights of about 200,000 but other molecular weight butyl rubbers of 100,000 to 350,000 may also be employed.

The term "EPDM" is used herein in the sense of its definition as found in ASTM-D-1418-64 and is intended to mean an elastomeric terpolymer containing ethylene and propylene in the backbone and a diene in the side chain. Illustrative methods for producing these terpolymers are found in U.S. Pat. No. 3,280,082, British Patent 1,030,289 and French Patent 1,386,600. The preferred EPDM elastomers contain about 45 to about 80 weight percent ethylene, 2 to 10 weight percent diene monomer, the balance of the polymer being propylene. The diene monomer is preferably a nonconjugated diene and illustrative examples include hexadiene, dicyclopentadiene, ethylidene norbornene, methylene norbornene, propylidene norbornene and methyl tetrahydroindene. A typical EPDM polymer is one having a Mooney viscosity at 212° F. of about 90 prepared from a monomer blend having an ethylene content of about 56 weight percent and a nonconjugated diene content of about 2.6 weight percent.

In preparing a butyl rubber or EPDM elastomer latex it is customary and conventional to dissolve the elastomer in a suitable solvent which is liquid under ordinary circumstances but which is later removed from association with the elastomer by distillation or other suitable readily accomplished means. Suitable solvents are usually the hydrocarbon solvents such as hexane, heptane, octane, isooctane, the higher fractions of paraffins such as Varsol, Solvesso 100 (a substantially 100% aromatic hydrocarbon fraction boiling between 315° and 350° F.), benzene, and toluene. The solution of the elastomer in the conventional hydrocarbon solvents is termed a "cement". To this cement solution there is added an aqueous solution of emulsifier.

Often antifoaming agents are used in latex preparation to increase the rate of monomer or solvent stripping by preventing foam buildup. Oxyethylated alcohols or phenols, such as polyoxyethylated octyl or nonylphenol containing from 7 to 12 ethylene oxide units, higher alcohols such as 2-octanol, tributyl phosphate, milk, silicones, fatty acids and esters and many commercially available mixtures can be used for foam inhibition and foam breaking. Of course, these materials are used, if necessary, only in the amount required to achieve the desired results.

With the addition of the emulsifier and water to the butyl rubber or EPDM cement, the material is then subjected to an intense mixing operation wherein the two immiscible liquids are subjected to a suitable homogenization such as with a colloid mill, a sonic mixer, a dispersator, a Waring blender or the like. A particularly suitable homogenizer is the sonic mixer which consists of a pump which forces the material through an orifice and impinges the stream on a knife edge or a vibrating blade enclosed in a resonating bell. A suitable sonic homogenizer is the Sonolator which is marketed by Sonic Engineering Company. Additionally, the homogenizer manufactured by Gifford-Wood, or a colloid mill may be used or a combination of a homogenizer and a Sonolator may be employed in series. Generally, the emulsification is complete upon making three or four passes through the orifices and shearing surfaces. Once the emulsification or homogenization has been completed, the material which is called the raw emulsion or raw latex is next subjected to a stripping operation for the purpose of removing the hydrocarbon solvent and excess water still present in the emulsion. This is accomplished usually by heating the raw emulsion to from 100° to 200° F. or higher depending upon the particular solvent employed but at least sufficient to volatilize the solvent and to produce a finished latex. Vacuum can be used if desired. The hydrocarbon solvent and part of the water is removed by conventional means leaving the finished latex as a final mixture usually having a solids content ranging between about 50 and 68 weight percent of EPDM or butyl rubber. The latex particle size distribution generally has an average of less than one micron.

Various chemical classes of emulsifiers have been used in preparing latices. One particularly valuable class is the carboxylate soaps in which a carboxylic acid has reacted with an alkali metal hydroxide such as sodium hydroxide, potassium hydroxide, rubidium hydroxide, or cesium hydroxide, ammonia, or an amine such as methyl amine, ethyl amine or ethanolamine to form the soap. The carboxylic acid can be formed with an aliphatic hydrocarbon radical, either saturated or unsaturated, or a complex hydrocarbon ring system. Generally, in latex preparation, fatty acids such as oleic, stearic, palmitic, linoleic, naturally occurring mixtures of fatty acids, or the terpene and tall oil rosin acids have been used as emulsifiers. Soaps from these materials have the useful property of reacting with strong acids such as sulfuric, hydrocholoric and nitric, as well as organic acids such as acetic and formic acid; multivalent cations such as $Ca^+$, $Al^{+++}$, or $Mg^{++}$; salts such as cyclohexylammonium acetate; or ethyl alcohol, acetone, etc., so that their surface-activity is destroyed and the latex, prepared using these soaps, coagulates (coacervates). This is useful in coagulant dipping to form balloons, gloves, etc. and in the preparation of foam rubber and thread.

Butyl rubber latices have been prepared using alkali metal salts or ammonium salts of fatty acids such as potassium oleate or sodium oleate as the principal emulsifier. However, these latices generally require the use of other protective colloids and stabilizers to prepare them. In U.S. Pat. No. 2,944,038 it is taught that both polyvinyl alcohol and octylphenoxytriethoxyethanol are needed in conjunction with the fatty acid salt to make the latex. This is also taught in U.S. Pat. No. 3,062,767 where these materials act as latex stabilizers during and after the stripping operation. Nonionic stabilizers, since they cannot be coagulated with acids or multivalent cation salts, interfere with the ease of coacervation and can produce latices which are difficult to coacervate with acids or multivalent cation salts.

An additional technique for preparing latices is taught in U.S. Pat. No. 3,062,767 in which dilute aqueous emulsifier and raw latex are mixed and stripped of solvent. Use of excess emulsifier to stabilize emulsions is not desirable. Cook, *Latex, Natural and Synthetic*, Reinhold Publishing Corp., N.Y., 1956, page 51, states "in spite of the fact that they are very widely used there are at least two objections to the use of fatty acid soaps as latex stabilizers. They may increase viscosity more than desired and they may cause the latex to foam easily."

For many useful applications such as dipping, foam manufacturing and thread formation the desired latex stabilizer should give a stable raw latex and a mechanically stable finished latex without increasing viscosity and without interfering with coagulability.

The low unsaturation elastomer latices of the present invention offer the combined desirable properties of good mechanical stability, relatively low viscosity and excellent coagulability, the latter property being the ability of the finished latex to be cast or formed into films, threads and the like using chemical coagulants. Coagulability depends to a great extent on the use of an emulsifier system which will lose its surfactant properties upon addition of a chemical coagulant. Latices with good coagulability, such as those prepared in accordance with the present invention, will form films of about 0.02 inch thickness when treated with coagulant agents such as acids or calcium salts. Latices with poor coagulability characteristics will form films of only about 0.002 inch thickness.

Latices of the present invention also exhibit excellent mechanical stability having a coagulum value of about 1.5% by weight or less, based on the weight of raw latex, when subjected to high speed shearing or mixing. This property is evaluated by stirring in a high speed mixer at about 19,000 rpm for about 30 minutes at elevated temperature. The latices of the present invention usually exhibit a desirable percent coagulum of between about 0.5 and 1.2%.

The latices of the present invention also have a desirable low viscosity (Brookfield) in the range of about 1000 to 2000, preferably about 900 to 1200 centipoises. Viscosity, as is known in the art, is a function of many factors including particle size, solids content, type and amount of surfactant and the like. The composition of the present invention offers a viscosity in an optimum range and substantial improvements in viscosity are noted when latices prepared in accordance with the emulsifier system of the present invention are compared with latices produced using only a simple carboxylate salt emulsifier.

It has now been discovered in accordance with the present invention that low unsaturation elastomer latices, such as butyl rubber and EPDM latices, and in particular butyl rubber latices with a desirable low viscosity and excellent coagulability can be prepared using conventional equipment by employing a unique stabilizer salt derivative as part of the emulsifier composition at the time of emulsification. Improved mechanical stability in both raw and finished latex is achieved, without an undesirable increase in viscosity and without affecting ease of coagulation, through the use in the emulsifying agent of an additional ingredient which is a long chain aliphatic mono or dicarboxylic acid or anhydride in the form of its alkali metal, ammonium, or amine salt. The long chain aliphatic radical of the acid, diacid, or anhydride is generally derived from a lower alpha monoolefin which is polymerized or copolymerized by well known polymerization techniques to produce polymers of propylene, butene-1, or isobutylene having number average molecular weights ranging between about 500 and about 3500. One of the aforementioned mono-alpha olefins can be copolymerized with, for example, styrene, butadiene, isoprene, piperylene, chloroprene and the like to produce corresponding low molecular weight polymers. These materials upon condensation with unsaturated aliphatic carboxylic acids either mono- or diacids, or their anhydrides produce condensate acids, diacids, or anhydrides which are old in the art. Their method of production and their usefulness are shown in such patents as U.S. Pat. No. 3,172,892 and U.S. Pat. No. 3,448,048. In those patents, these compounds are produced and are useful, or derivatives thereof are useful, as dispersants in lubricating oil compositions. The unsaturated anhydride component with which the olefin polymers, or copolymers are condensed may be maleic anhydride or succinic anhydride. The free acids condensed with the olefin polymers or copolymers may be an unsaturated carboxylic acid such as acrylic acid, methacrylic acid, alpha methyl acrylic acid, crotonic acid, cinnamic, isocrotonic acid and the like. The instant invention does not reside in the formation of these condensation products but in their novel use in the form of an alkali metal, ammonium or amine salt. Examples 1 through 24 of U.S. Pat. No. 3,448,048 amply illustrate the method of formation of the acrylate condensate compounds and U.S. Pat. No. 3,172,892, example 1 shows how polyisobutenyl succinic anhydride is produced. Simple neutralization accomplishes the salt formation either in situ or as an external and separate neutralization operation. The molecular weight of the polymer reactant employed generally determines the molecular weight of the final condensates since the bulk of the molecular weight is represented by the polymeric or copolymeric substituent of the aliphatic carboxylic acid. Specifically, polyisobutenyl succinic anhydride in the form of its potassium or sodium salts having a number average molecular weight of from 850 to 1500 has been particularly useful. The polyisobutenyl acrylic acid salt in the form of its potassium or sodium salts and having a number average molecular weight of from about 850 to about 1500 is also useful from the standpoint of securing improved mechanical stability characteristics in butyl latices. The amount of the additive employed would generally run between about 0.5 and about 8.0 parts of the additive salt per 100 parts of butyl rubber contained in the latex, preferably from about 2 to about 6 phr of carboxylic acid salt is employed.

These amounts provide a two-component emulsifier composition consisting essentially of about 25% to 80% by weight of the aforesaid ammonium, alkali metal or amine salt of the long chain alpha olefin polymer or copolymer substituted organic unsaturated aliphatic mono or dicarboxylic acid or anhydride and 75% to 20% by weight of the ammonium or alkali metal $C_{12}$–$C_{24}$ fatty acid soap. Preferably, these emulsifier compositions will contain approximately equal amounts of each component such as 45 to 55% of the polymeric component and 55 to 45% by weight of the $C_{12}$–$C_{24}$ fatty acid soap component with optimum results being obtained when 50% by weight of each is employed. As a two-component emulsifier system the emulsifier composition of the present invention is believed to be a novel composition and as such constitutes a further embodiment of the present invention. Preferably the polymeric component is the potassium salt form of polyisobutenyl succinate or acrylate having a number average molecular weight of about 850 to 1500, such as about 1000 to 1300.

The resultant latex may be admixed with curing agents such as zinc oxide, sulfur, sulfide and thio accelerators and other conventional curing agents for use in producing dipped goods such as surgical gloves and so forth wherein the coagulation is accomplished by pretreatment of the articles being dipped with a strong mineral acid or certain organic acids such as formic acid or acetic acid, with inorganic metal salts of strong mineral acids such as calcium nitrate, calcium chloride, magnesium sulfate, or aluminum sulfate, or with isopropyl alcohol or other conventional coagulating agents, followed by curing the so coagulated material at a temperature of about 240° F., for example for from 1 to 2 hours in an air oven, thus obtaining low unsaturation elastomer latex films of, for example, about 2400 psi tensile strengths and with elongations of, for example, about 1000%.

The following examples are illustrative of the invention.

EXAMPLE 1

A butyl rubber, an isobutylene (98.5 mole %) isoprene (1.5 mole %) copolymer having number average molecular weight of about 200,000 (EXXON BUTYL 268) was dissolved in toluene to form a 16% cement. To 938 grams of this cement was added 7.6 grams (5 phr) of a commercial mixture known as Neofat 92-04 [77% oleic acid, 6.5% palmotoleic acid and 6.5% linoleic acid as well as about 3% each of palmitic and myristic acid], together with 15 grams of a 50% toluene solution of polyisobutenyl succinic anhydride having a number average molecular weight of about 1000. This is about 5 parts of polyisobutenyl succinic anhydride per hundred parts of rubber used. This solution was mixed and to it was added a mixture of about 938 grams of water and about 12.5 grams of 10% aqueous potassium hydroxide to neutralize the emulsifier composition. The cement was added slowly to the aqueous potassium hydroxide mixture over a period of 3 to 5 minutes, with stirring. The mixture had a final pH of about 10.1 and was adjusted with KOH to about 10.5 with 10% aqueous KOH. The mixed partial emusion was then run through a homogenizer for about 15 minutes. This emulsion was then passed to a rotary evaporator where the toluence and excess water was stripped from the material and a final toluene free stripped latex was recovered having a 61.5% solids content.

It has been found that butyl latices containing about 5.5 wt. % of potassium oleate and about 5.1 wt. % of the potassium salt of polyisobutenyl succinate or acrylate have excellent mechanical stability and low viscosity as in part shown in Table I with respect to the use of the succinate salt. The film properties of the cured composition prepared from a butyl latex containing about 5.5 wt. % potassium oleate and about 5.1 wt. % of the potassium salt of polyisobutyl succinate are good as shown in Example 2.

In contrast, raw latices that were prepared using only 5.5% potassium oleate and no succinate salt had poor high temperature mechanical stability and thus would be solvent stripped with difficulty. The novel finished latex had a desirable viscosity as shown in Table 1. When 11% potassium oleate was used instead of 5% potassium oleate, the latex had improved high temperature mechanical stability in the form of the raw latex but the finished latex had an undesirably high viscosity as shown in Table I.

TABLE I

COMPARISON OF BUTYL RUBBER LATEXES

| Emulsifier | Amount | High Temp. Mechanical Stability of Raw Latex (a), % Coagulum Formed | Viscosity of Finished Latex |
| --- | --- | --- | --- |
| K Oleate | 5.5 phr | 15% | 825 cps |
| { K Oleate<br>K Polyisobutenyl succinate } | 5.5<br>5.1 | 0.9% | 1140 cps |
| K Oleate | 11.0 | 2.5% | 6600 cps | a. High Temperature Mechanical Stability Test procedure:

Fifty grams of the raw latex of known solids content is placed in a 400 ml tall form beaker. The beaker is placed in a water bath maintained at 180° F. The contents are sheared using a Hamilton-Beach mixer at 19,000 rpm for 30 min. The resulting material is diluted with water and passed through a 100 mesh screen. The retained solids are weighed. Percent Coagulum formed is:

Retained Solids/Original Solids × 100%.

EXAMPLE 2

Two coagulable butyl latices were compounded each using the following base composition:

|  | Parts by Wt. | |
|---|---|---|
|  | Dry | Wet |
| Coagulable Butyl Latex (~55% solids) | 100 | 182 |
| Merac (diluted 1:1 with water)[1] | 4.0 | 8.0 |
| Sulfur (68% in water) | 3.0 | 4.8 |
| Zinc Oxide (60% in water) | 5.0 | 8.4 |
| Zinc Dibutyl Dithiocarbamate (50% in water) | 4.0 | 8.0 |

[1]Merac is an alkyl dithiocarbamate manufactured by Penwalt Corp.

The latex was adjusted to pH 10.5 with 10% KOH. The latex was placed in a 300 ml beaker and the ingredients added in the order listed.

A first coagulable butyl latex using the above base composition and containing 5 phr of potassium oleate was compounded and then stirred with a 2 inch diameter blade at 600 rpm. It coagulated in about 4 hours of stirring.

A second coagulable butyl latex, using the same base composition, and containing 5.8 phr of potassium oleate plus 5.1 phr of potassium polyisobutenyl succinate (1000 M. W.) was compounded and then stirred with a 2 inch diameter blade at 600 rpm. It had not coagulated after 24 hours of stirring. This last mentioned compounded latex was cast into films and the films were dried. After curing 1 hour at 240° F. the films had a tensile strength of about 2400 psi and about 1000% elongation.

EXAMPLE 3

A latex was prepared using a procedure similar to that of Example 1 except that 5.1 phr of potassium polyisobutenylacrylate of about 1300 number average molecular weight was used instead of 5.1 phr of potassium polyisobutenyl succinate. The emulsion formed with no difficulty. The raw latex when run in the high temperature mechanical stability test gave an acceptably low coagulum level of 1.2%.

Having now thus fully described and illustrated the character of the invention, what is desired to be secured by letters patent is:

1. A process of preparing a mechanically stable coagulable low unsaturation elastomer latex which consists essentially in admixing a butyl rubber or EPDM elastomer hydrocarbon solvent cement with water and an emulsifier composition consisting essentially of 0.5 to 8.0 parts per hundred parts of elastomer of an ammonium or alkali metal soap of a fatty acid containing 12 to 24 carbon atoms or mixtures of such fatty acids and as a second stabilizer additive 0.5 to 6.0 parts per hundred parts of elastomer of an ammonium, alkali metal, or amine salt of a long chain alpha olefin polymer or copolymer substituted organic unsaturated aliphatic mono or dicarboxylic acid or anhydride thereof, said long chain alpha olefin polymer or copolymer salts having a number average molecular weight between about 500 and about 3500, homogenizing and shearing said admixture into an emulsion, removing hydrocarbon solvents therefrom and recovering said latex, the latex being characterized as a low viscosity latex having a solids content of 50 to 68 percent by weight and a coagulum of less than about 1.5 percent by weight.

2. A process as in claim 1 wherein the soap is an alkali metal or ammonium oleate and the stabilizer salt additive is the alkali metal or ammonium salt of polyisobutenyl succinic anhydride.

3. A process as in claim 1 wherein the soap is potassium oleate and the stabilizer salt is the polyisobutenyl succinic anhydride potassium salt of about 1000 number average molecular weight.

4. A process as in claim 1 wherein about 5 parts per hundred each of said soap and said stabilizer additive salt are employed.

5. A process as in claim 1 wherein the soap is an alkali metal or ammonium oleate and the stabilizer additive salt is an alkali metal or ammonium salt of a polyisobutenylacrylic acid.

6. A process as in claim 5 wherein the soap is potassium oleate and the stabilizer salt is a potassium polyisobutenylacrylate of about 1300 number average molecular weight.

7. The process of claim 1 wherein the elastomer is butyl rubber.

8. The process of claim 1 wherein the elastomer is an EPDM.

9. A mechanically stable coagulable elastomer latex composition having a viscosity of from about 500 to 2000 centipoises and a high temperature mechanical stability of less than about 1.5% by weight coagulum at 180° F. consisting essentially of 50 to 68% by weight of a butyl rubber or EPDM elastomer, water, 0.5 to 8.0 parts per hundred parts of elastomer of an ammonium or alkali metal soap of a fatty acid containing 12 to 24 carbon atoms and 0.5 to 6.0 parts per hundred parts of elastomer of an ammonium, alkali metal or amine salt of a long chain alpha olefin polymer or copolymer substituted organic unsaturated aliphatic mono or dicarboxylic acid or acid anhydride having a number average molecular weight between about 500 and 3500.

10. The latex composition of claim 9 wherein the elastomer is butyl rubber.

11. The latex composition of claim 9 wherein the elastomer is an EPDM.

12. The latex composition of claim 9 wherein the said soap is an alkali metal or ammonium oleate.

13. The latex composition of claim 9 wherein said polymer salt is an alkali metal or ammonium salt of polyisobutenyl succinic anhydride or polyisobutenyl acrylic acid having a number average molecular weight of about 850 to 1500.

14. The latex composition of claim 9 wherein about 5 parts per hundred each of said fatty acid soap and said polymer salt are present.

15. An emulsifier composition consisting essentially of, by weight, (a) about 25 to 80% by weight of an ammonium, alkali metal or amine salt of a long chain alpha olefin polymer or copolymer substituted organic unsaturated aliphatic mono or dicarboxylic acid or acid anhydride having a number average molecular weight of about 850 to 1500, and (b) 75 to 20% by weight of an ammonium or alkali metal soap of a fatty acid having 12 to 24 carbon atoms.

16. The composition of claims 15 wherein there is present about 45% to 55% of said (a) component and 55% to 45% of said (b) component.

17. The composition of claim 15 in which the (a) component is a salt of oleic acid.

18. The composition of claim 15 wherein said (b) component is polyisobutenyl succinate or acrylate in the form of the potassium salt and having a number average molecular weight of about 850 to 1500.

* * * * *